United States Patent

[11] 3,583,641

| [72] | Inventor | Peter Klaus Sterz<br>Wolfsburg, Germany |
|---|---|---|
| [21] | Appl. No. | 788,802 |
| [22] | Filed | Jan. 3, 1969 |
| [45] | Patented | June 8, 1971 |
| [73] | Assignee | Volkswagenwerk Aktiengesellschaft<br>Wolfsburg, Germany |
| [32] | Priority | Jan. 5, 1968 |
| [33] | | Germany |
| [31] | | P 16 55 657.3 |

[54] DEVICE FOR PREVENTING COATING OF WINDSHIELDS
6 Claims, 5 Drawing Figs.

[52] U.S. Cl. .................................................. 239/284,
239/566, 239/568
[51] Int. Cl. .................................................. B05b 1/10
[50] Field of Search .......................................... 239/128,
129, 130, 284, 550, 566, 568

[56] References Cited
UNITED STATES PATENTS

| 2,154,731 | 4/1939 | Crowley | 239/284X |
| 2,312,187 | 2/1943 | Patterson | 238/284 |
| 2,718,037 | 9/1955 | Lintern | 239/284X |
| 2,968,071 | 1/1961 | Perna | 239/284 |
| 3,366,336 | 1/1968 | Neuschwanger et al. | 239/284X |

*Primary Examiner*—M. Henson Wood, Jr.
*Assistant Examiner*—Michael Y. Mar
*Attorney*—Watson, Cole, Grondle & Watson ABSTRACT: A device mounted along the bottom of a windshield of motor vehicles having a channel portion with spaced nozzle openings to direct streams of heated air onto and along the windshield glass.

PATENTED JUN 8 1971  3,583,641
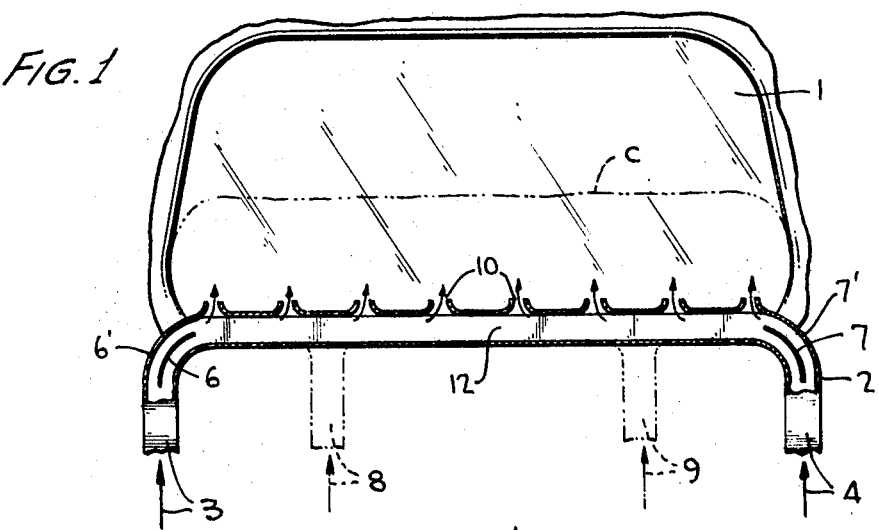
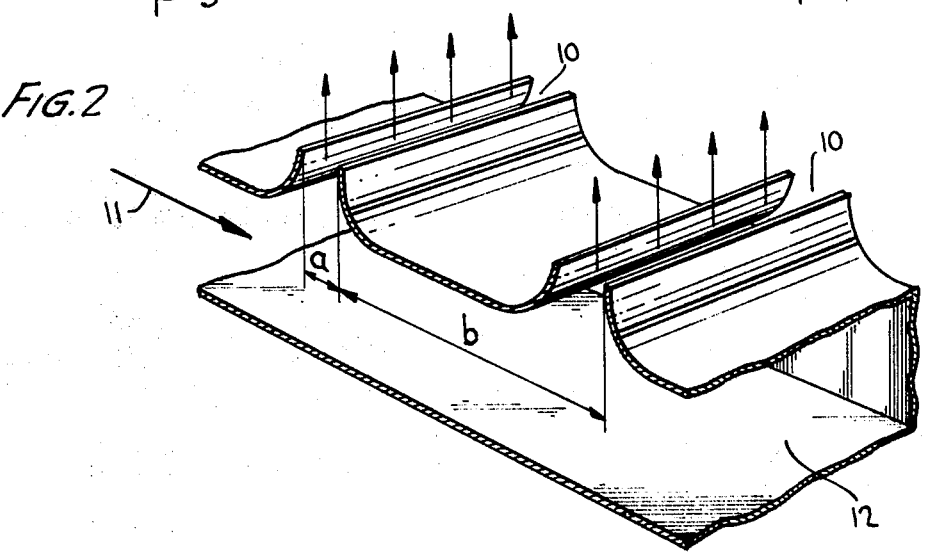
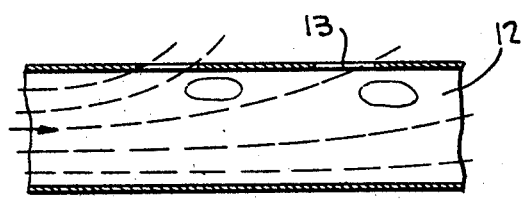
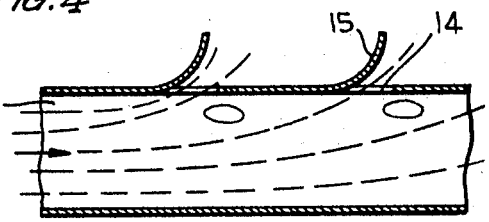
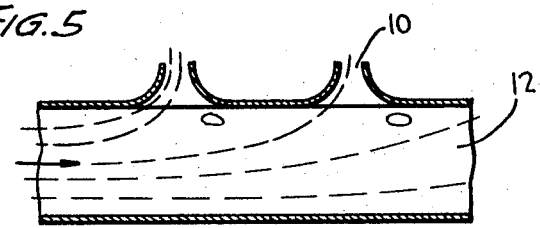
INVENTOR,
PETER KLAUS STERZ
BY Watson, Cole, Grindle & Watson
ATTORNEYS

DEVICE FOR PREVENTING COATING OF WINDSHIELDS

This invention relates to a device to maintain glass or plastic sheets or plates clear, such as windshields of motor vehicles utilizing airstreams and particularly heated airstreams.

In order to maintain windshields clear and clean, air nozzles can be utilized in order to direct heated airstreams against the windshield. In order to provide for, as near as possible, uniform airstreams over the entire width of the windshield, it is necessary to utilize a series of slit- or slot-formed nozzles which have narrow air-guiding means. Such a plurality of airstream nozzles are necessary but at the same time it is at times difficult and also impossible to apply such nozzles where necessary. If one requires merely two airstream nozzles approximately adjacent the lower corners of the windshield, then the airstreams will be directed over the windshield itself in a nonuniform manner, so that parts of the windshield may not receive any required airstream.

It is therefore an object of the invention to provide means in order to direct, as much as possible, uniform airstreams over the entire surface of the windshield with as little as possible resistance to the airstreams and which are directed by means of only two air entry members into airstream nozzles or jets suitably spaced. The invention therefore is directed to a windshield having air supplied thereto on the outer surface from a manifold tube providing air inlets at both ends thereof and secured adjacent the bottom of the windshield, so that in this way the entire width of the windshield will be provided with channel nozzles to direct the air over the outside surface of the windshield. Insofar as there is sufficient space, it is advisable that the channel or supply tube itself shall be at least one to five times the cross section of the main supply channel and the supply portions from the horizontal channel under the windshield shall be provided in such a way to diffuse the passage of the air in the main channel. For this purpose, there is provided in the channel a static pressure and by means of simple and uniform bridge members or baffles, it is possible to obtain a uniform airstream to be directed onto the windshield. Since the channel itself cannot have an essentially large cross section over and above the channels which feed the main channel, there must be provided a uniform stream division by constructing the main channel with outlet openings or valves and preferably having the same or different outlet openings relative to the channel itself. The outlet openings will thus have a construction so that the airstreams will be directed from the nozzles onto the windshield. In this way in addition to a uniform stream division, there will also be attained very resistive outlets for the airstreams. In order to obtain uniform outlets over the entire length of the channel, the latter can preferably have air inlets at both ends and also in the middle section. It is preferably best to have a constant cross-sectional passage for the air in order to avoid a nonuniform streaming of the air from the left and the right and in order that the middle portion at the zone where the two streams will come together, there shall be a constant cross section in the feed tube itself. The length of the feed tube can be so selected in order that there shall be a uniform feeding of air from the various nozzles and thus there will be provided the desired outlet opening forces on the streams of the air along the entire length of the feed channel.

Further objects will be apparent from the following description when considered in connection with the accompanying drawing in which;

FIG. 1 is a diagrammatic front view partly in section of a windshield for a vehicle with the fluid passages and nozzles adjacent the bottom thereof;

FIG. 2 is a prospective view of a portion of the fluid channel with outlet nozzles on a larger scale;

FIG. 3 is a diagrammatic view of a portion of one form of the channel with openings for the fluid;

FIG. 4 is a diagrammatic view of a second modified channel and openings, and;

FIG. 5 is a diagrammatic view of a third modified channel with nozzle openings.

With reference to FIG. 1, a channel member 2 preferably made from an artificial material is provided below and adjacent the windshield 1, of a vehicle and which is preferably made of a heat-insulating material with two lateral inlet portions indicated with the arrows 3 and 4 for the heated air. The channel which is below the windshield 1, has on its upper side, a plurality of outlet nozzles 10, which are more or less slits and directed at right angles relative to the channel and having openings adjacent the windshield 1, for each outlet. By means of the branch channel members or tubes 3 and 4, heated air may be fed into the main horizontal channel member in order to direct such heated air toward and through the outlets or nozzles 10. Short and curved sheetmetal baffles 6 and 7, are provided at the end curved portions 6' and 7' in order to increase the airflow in the channel to be ultimately directed upwardly into and through the horizontal channel 12 and the nozzle openings 10.

As shown in FIG. 2, the arrow 11 indicates the flow of fluid in the channel 12 and ultimately into the upwardly directed nozzle openings 10, as clearly shown in FIG. 2 of the drawing. In accordance with FIG. 3, the outlet openings in the channel 12 have merely slotlike openings 13, whereas FIG. 4, shows openings 14 with an upwardly bent and curved portion 15 for each opening 14. This structure according to FIG. 4, will present a certain effect to the fluid streaming through the openings 14 and the purpose of the curved portions 15 is to provide an effective outlet angle for the fluid to be directed from the channel 12. By the form of the structure set forth in FIG. 3, there is provided an outlet angle of approximately 90°. As clearly indicated in FIG. 2, of the drawing the width of each outlet is indicated as $a$ for each nozzle, and the distance $b$ will indicate the constant width of each two nozzle openings. It has been determined that in accordance with the structure of the nozzles as set forth in FIG. 2, of the drawing, there will result a particularly uniform fluid division for the fluid flowing in the channel 12, and as indicated in FIG. 1 of the drawing, the influence of the fluid flowing from the nozzles will reach at least a distance indicated by the dot and dash line $c$ as a direct influence of the streams of fluid on the windshield.

While it may be sufficient to provide merely two end channel members at 3 and 4 for warm air, it is also possible to provide additional inlet members as indicated at 8 and 9 for fresh air, to the parts of the channel 12, intermediate the curved end portions.

I claim:

1. A device to maintain a windshield glass plate clear and clean comprising a channel pipe member having a plurality of spaced nozzle openings in upwardly direction and secured along the bottom edge of the windshield, and an inlet at each end secured to the channel pipe to supply heated air to the latter from each end against each other to be forced out of the openings as jet streams onto the entire surface width of the windshield.

2. A device according to claim 1, in which each nozzle has upwardly bent portions terminating in outlet edges with each nozzle being directed longitudinally as to the upper outlet edges thereof.

3. A device according to claim 1, in which each nozzle is directed longitudinally with inwardly curved side portions directed to the middle of the outlet with the curved side portions having a constant curvature.

4. A device according to claim 1, in which each end of the channel pipe has a curved inlet section with a curved baffle plate therein.

5. A device according to claim 1, in which the channel pipe member has a cross section of at least one and a half times the width of the nozzle openings.

6. A device according to claim 1, in which additional fluid inlets are provided along the length of the channel pipe for entry of fresh air.